E. T. PARSONS.
FLOUR SIFTING APPARATUS.
APPLICATION FILED NOV. 14, 1917.

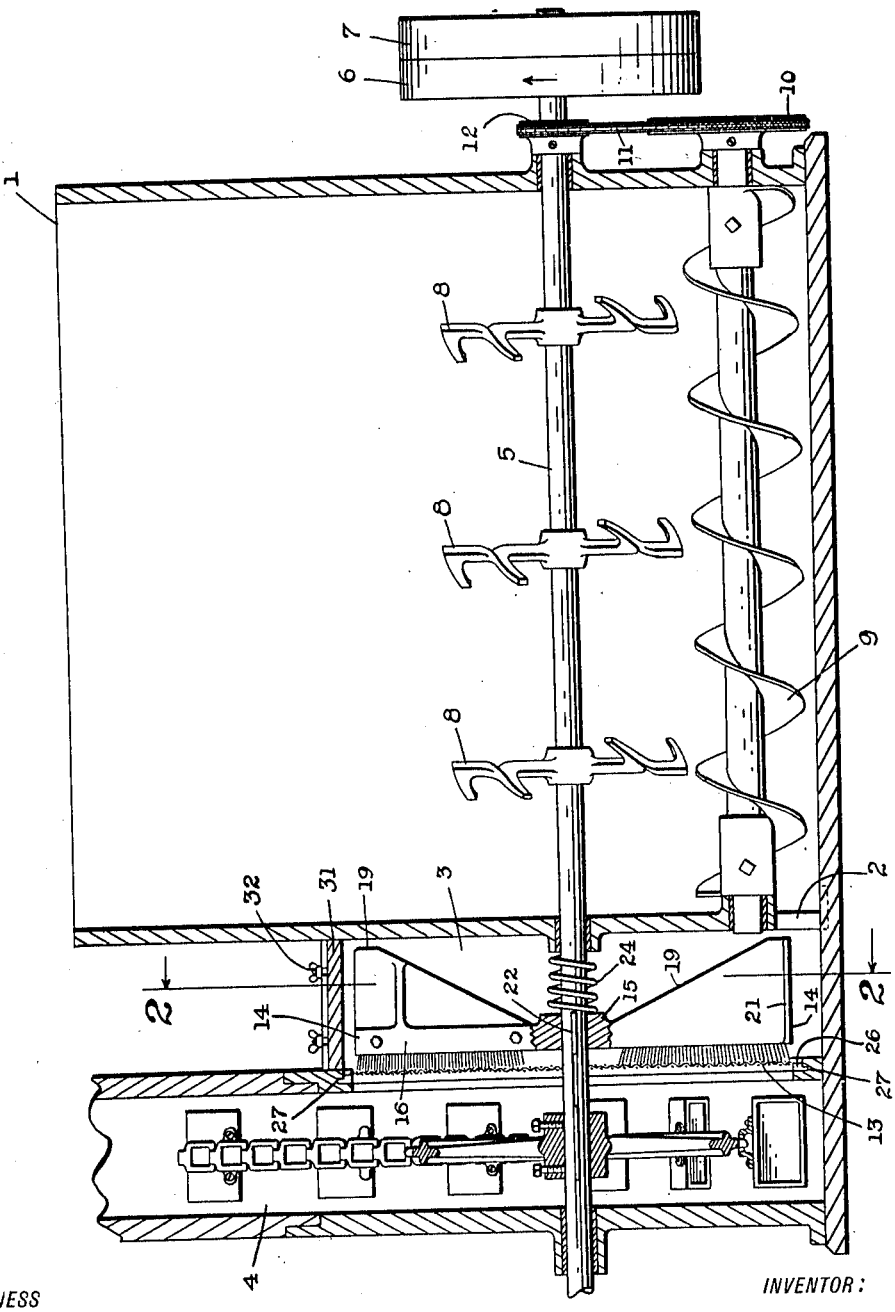

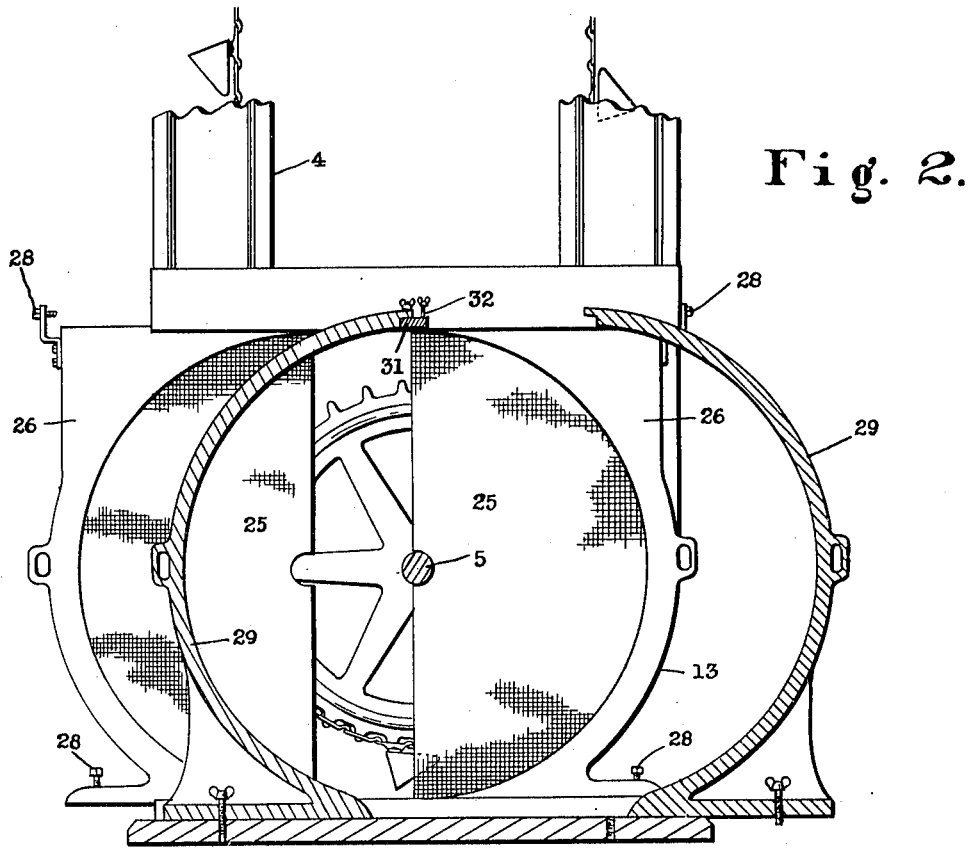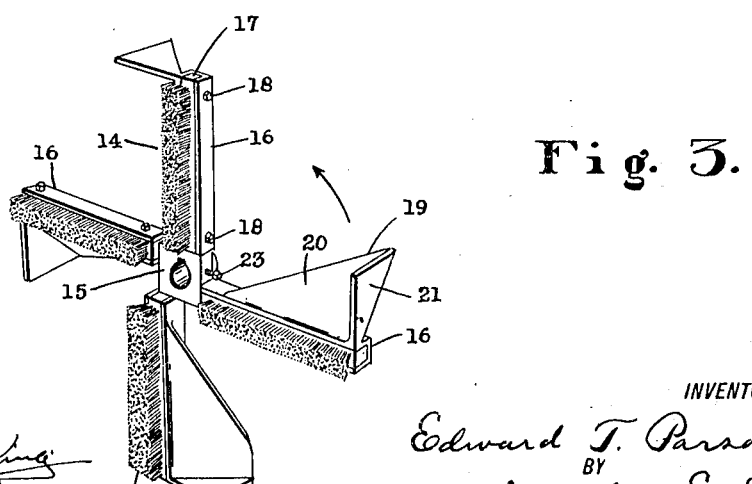

1,313,729.

Patented Aug. 19, 1919.
3 SHEETS—SHEET 3.

WITNESS
Howard P. King

INVENTOR:
Edward T. Parsons,
BY
Marble & Everett,
ATTORNEYS.

UNITED STATES PATENT OFFICE.

EDWARD T. PARSONS, OF NEWARK, NEW JERSEY.

FLOUR-SIFTING APPARATUS.

1,313,729. Specification of Letters Patent. Patented Aug. 19, 1919.

Application filed November 14, 1917. Serial No. 202,038.

*To all whom it may concern:*

Be it known that I, EDWARD T. PARSONS, a citizen of the United States of America, and a resident of Newark, in the county of Essex and State of New Jersey, have invented new and useful Improvements in Flour-Sifting Apparatus, of which the following is a specification.

The objects of this invention are to provide improved means for sifting, screening or blending flour as it is discharged from its containing bin; to enable the flour to be evenly distributed over a vertical screen in sifting; to prevent the flour from caking during the screening, and to positively open or loosen it up and aerate it; to thus improve the flour for use and enable it to absorb more moisture; to permit the screen to be removed and another of different mesh substituted therefor when desired; to make the various parts of the apparatus accessible for cleaning and the like; to secure simplicity of construction and operation, and to obtain other advantages and results as may be brought out in the following description.

Referring to the accompanying drawings, in which like numerals of reference indicate the same parts throughout the several views, Figure 1 is a vertical longitudinal section of a flour sifting apparatus embodying my invention;

Fig. 2 is a transverse sectional view, taken on line 2—2 of Fig. 1, with the brush omitted and one screen section and one casing section partially withdrawn;

Fig. 3 is a perspective view of the brush;

Figure 4:
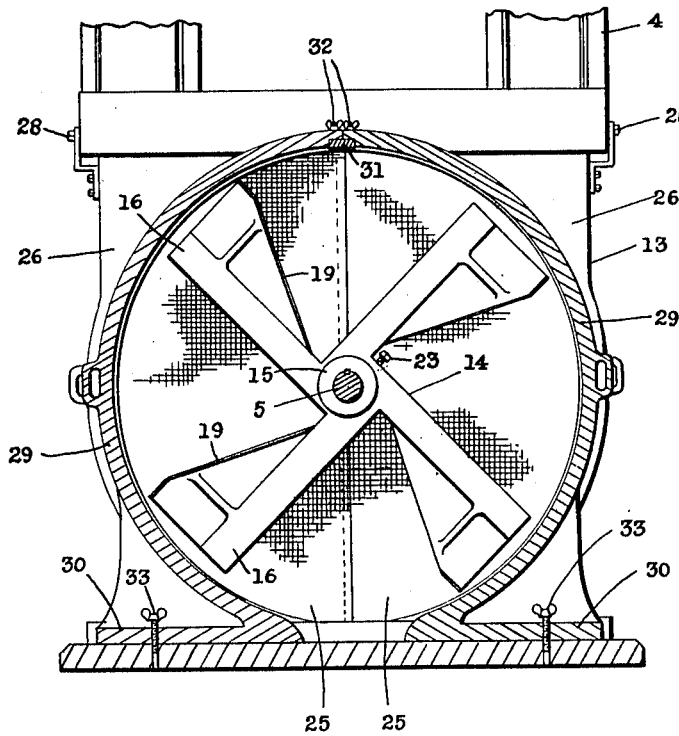
Fig. 4 is a view similar to Fig. 2, showing the casing and screen in operative position and the brush mounted in place.
Figure 5:
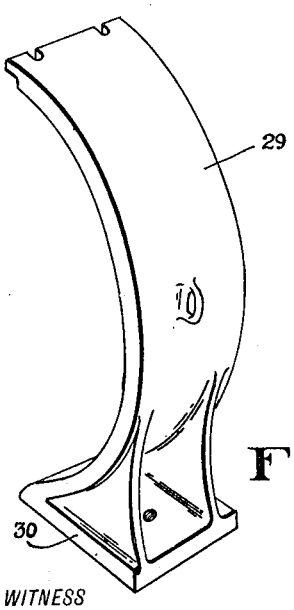
Fig. 5 is a perspective view of one section of the removable casing for the sifting chamber.
Figure 6:
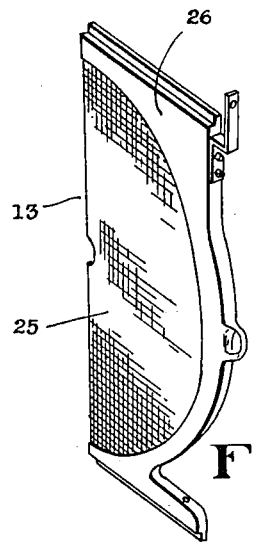
Fig. 6 is a perspective view of one screen section.

In the specific embodiment of the invention illustrated in said drawings, the reference numeral 1 indicates a flour bin of suitable capacity having an outlet 2, preferably through one end of itself at its bottom communicating with a flour sifting or screening chamber 3 upon the outside of said bin and included between said bin and an elevator 4. While I have shown a bin and an elevator for containing and receiving the flour before and after it is sifted, respectively, it is to be understood that other supply and receiving means may be employed if desired.

In the present disclosure I have shown a shaft 5 extending longitudinally of the bin through the sifting chamber 3 and the elevator casing, said shaft having fast and loose pulleys 6, 7 outside of the bin by means of which the shaft may be driven from any suitable source of power (not shown). Within the bin 1 and fast upon said shaft are a plurality of agitators 8. Preferably parallel to said shaft and below it, adjacent to the bottom of the bin is a screw conveyer 9 rotation of which is adapted to feed the flour through said opening 2 in the end of the bin. The conveyer is shown as projecting from the end of the bin away from the sifting chamber and as having a sprocket wheel 10 fast upon said projecting end driven by means of a chain 11 from a sprocket 12 on the shaft 5.

Between the sifting chamber and the elevator is a screen 13 through which the flour if sifted, and this screen is upright or in a substantially vertical plane, so that it is not subjected to the weight of the flour. This is an important feature of my invention, because I combine means, such as the brush 14 shown, for simultaneously distributing throughout the sifting chamber the flour which enters its bottom and causing the same to pass through the screen which forms one wall of said chamber. In other words, the brush picks up small quantities of flour from the bottom of the sifting chamber and by its rotation and the changing inclination of its arms agitates the flour and aerates it, and at the same time the action of the brush carries the flour into contact with the screen through which it passes to the elevator.

Said brush preferably comprises a fan-like body portion having a hub 15 and radiating arms 16 which carry removable brush members 17, that is, members having bristles fixed in suitable backs. As shown, the arms 16 are channel-shaped and receive said backs of the brushes therein, bolts or the like 18 passing through said channel shaped arms and the backs of the brush members for securing said members in place. Obviously by removing the bolts the brush members may be removed and others inserted whenever desired. Said arms 16 are also provided with scoops 19 having each a portion 20 of itself extending longitudinally of the arm and brush member and sloping backwardly away from them. That is, the said portion 20 of the scoop slopes from its free edge toward the screen and brush member. At the outer end of the arm 16, the scoop has an end wall 21 coöperating with the sloping portion 20 to pick up flour as the brush rotates and direct said flour toward the screen, the rotation of the brush and engagement of the brush member with the screen acting to sift flour through said screen in a light and aerated condition.

The brush 14 is preferably slidably mounted upon the shaft 5 and caused to rotate therewith in any suitable manner as by means of the feather or key 22. A set screw 23 is shown by means of which the brush may be held against longitudinal movement upon said shaft if desired, although it is preferable to employ a spring 24 bearing against said brush so as to hold it with a constant pressure against the screen. This spring I have shown as mounted upon the shaft and bearing against the end wall of the bin, but obviously any other shoulder for the spring to bear against may be provided as found desirable.

It is often desirable to remove the screen 13 for one purpose or another, such as to substitute a screen of different mesh, and to accomplish this end I have shown the screen in two sections 25, 25, preferably separable upon a vertical line at the middle of the screen and each section adapted to be slid horizontally outward to remove it from operative position. As shown, the screen provides a frame 26 the upper and lower edges of which are slidably mounted in suitable grooves 27, 27 in the conveyer casing, and suitable means such as the set screws 28, 28 are provided at the top and bottom of said frame for holding the same in its operative position. Preferably when said sections are in such operative position their meeting edges overlap slightly, as shown in Fig. 4, so as not to present a crevice through which flour may pass without being sifted.

The sifting chamber 3 is preferably provided with removable closures 29 affording access to said chamber for cleaning and so forth. These closures I have shown as substantially semi-circular walls, the entire width between the bin and the elevator casing with feet 30, 30 adapted to support the closures in upright position. These closures may be slid out similar to the sliding out of the screen sections and expose the brush and space between the bin and elevator casing to full view. At their upper ends, these closures are adapted to overlie a cross-bar 31 and be clamped thereto by means of bolts 32. Other bolts 33 in the feet 30 of said closures may be screwed into appropriate sockets in the base of the apparatus and thereby hold said closures in position.

In operation, a quantity of flour is put in the supply bin 1, and as the agitators 8 and screw conveyer 9 rotate the flour is mixed or blended and fed through the outlet 2 into the sifting chamber 3. Here the brush 14, carried upon the same rotating shaft as the agitators, operates to aerate the flour and bring it into contact with the screen 13 for sifting it therethrough. By virtue of a constant pressure of the brush against the screen an even sifting of flour is obtained and at the same time the flour may be sifted rapidly in an open or aerated condition.

Obviously various modifications and changes may be made in the manufacture of my improved apparatus without departing from the spirit and scope of the invention, and I do not wish to be understood as limiting myself except as required by the following claims when construed in the light of the prior art.

Having thus described the invention, what I claim is,

1. The combination with a sifting chamber providing an upright screening wall, and means for supplying flour to said sifting chamber from outside the same, of a brush arranged and adapted to rotate in said sifting chamber in a plane parallel to the screening wall and distribute flour from the bottom of the sifting chamber throughout said sifting chamber and cause the same to pass through the screening wall, whereby the flour is aerated in the sifting chamber as well as sifted.

2. The combination with a sifting chamber providing an upright screening wall, and means for supplying flour to said sifting chamber from outside the same, of a brush adapted to rotate in said sifting chamber in a plane parallel to said screening wall and having a radial member engaging the same, and a scoop on said radial member having an end wall transverse thereto adapted to pick up flour from the bottom of the sifting chamber, whereby the flour is aerated in the sifting chamber as well as sifted.

3. The combination with a sifting chamber providing an upright screening wall, and means for supplying flour to said sifting chamber from outside the same, of a brush adapted to rotate in said sifting chamber in a plane parallel to said screening wall and having a radial member engaging the same, and a scoop on said radial member having an end wall transverse thereto adapted to pick up flour from the bottom of the sifting chamber and a front wall inclined toward the radial member to feed the flour to the screening wall.

4. The combination with flour supplying and receiving means, and an upright plane screen between said supplying and receiving means, of a brush adapted to rotate in a plane parallel to said screen on the same side thereof as the supply means, said brush having a radial member engaging said screen and permitting access of the flour to the screen at both sides of said brush member.

5. The combination with flour supplying and receiving means, and an upright plane screen between said supplying and receiving means, of a brush adapted to rotate in a plane parallel to said screen on the same side thereof as the supply means, said brush having a plurality of radiating members engaging the screen and providing access for the flour to the screen between said radial members.

6. The combination with flour supplying and receiving means, and an upright plane screen between said supplying and receiving means, of a brush adapted to rotate in a plane parallel to said screen on the same side thereof as the supply means, said brush having a radial member engaging said screen, and a scoop flaring from the forward edge of the brush away from the screen.

7. The combination with flour supplying and receiving means, and an upright plane screen between said supplying and receiving means, of a brush adapted to rotate in a plane parallel to said screen on the same side thereof as the supply means, said brush having a radial member engaging said screen, and a scoop flaring from the forward edge of the brush away from the screen and having an end wall closing the space between the flaring portion and the screen.

8. The combination with flour supplying and receiving means, and an upright plane screen between said supplying and receiving means, of a brush adapted to rotate in a plane parallel to said screen on the same side thereof as the supply means, said brush having a radial member engaging said screen, and a scoop flaring from the forward edge of the brush away from the screen, and having an outer end wall closing the space between the flaring portion and the screen, the edge of the flaring portion being inclined from said wall to the radial member near its inner end.

9. The combination of a sifting chamber providing an upright screening wall, a brush arranged and adapted to rotate in said sifting chamber in a plane parallel to said screening wall and distribute flour throughout said sifting chamber and cause the same to pass through the screening wall, and means for supplying flour to said brush from outside the sifting chamber.

In testimony whereof I have signed this specification in the presence of two subscribing witnesses.

EDWARD T. PARSONS.

Witnesses:
HOWARD P. KING,
MILDRED E. BROOKS.

Copies of this patent may be obtained for five cents each, by addressing the "Commissioner of Patents, Washington, D. C."